(12) United States Patent
Tong

(10) Patent No.: US 8,990,776 B2
(45) Date of Patent: Mar. 24, 2015

(54) COMPUTING DEVICE AND DEVICE DRIVER DEBUGGING METHOD

(75) Inventor: Yu Tong, Shenzhen (CN)

(73) Assignee: Zhongshan Innocloud Intellectual Property Services Co., Ltd., Guangdong (CN)

( * ) Notice: Subject to any disclaimer, the term of this patent is extended or adjusted under 35 U.S.C. 154(b) by 609 days.

(21) Appl. No.: 13/216,245

(22) Filed: Aug. 24, 2011

(65) Prior Publication Data

US 2012/0124556 A1    May 17, 2012

(30) Foreign Application Priority Data

Nov. 16, 2010 (CN) .......................... 2010 1 0546385

(51) Int. Cl.
*G06F 11/36* (2006.01)
(52) U.S. Cl.
CPC ................................. *G06F 11/362* (2013.01)
USPC ........................................... 717/125; 717/124
(58) Field of Classification Search
CPC . G06F 11/26; G06F 11/3624; G06F 11/3664; G06F 21/57
USPC ........................................................ 717/125
See application file for complete search history.

(56) References Cited

U.S. PATENT DOCUMENTS

| 5,889,988 | A  | * | 3/1999  | Held .............................. 718/103 |
| 7,140,004 | B1 | * | 11/2006 | Kunins et al. .................. 717/125 |
| 7,941,813 | B1 | * | 5/2011  | Protassov et al. ............. 719/321 |
| 2003/0079204 | A1 | * | 4/2003 | Loughran et al. ............. 717/124 |
| 2003/0177476 | A1 | * | 9/2003 | Sarma et al. .................. 717/128 |
| 2006/0048006 | A1 | * | 3/2006 | Lou ................................. 714/25 |
| 2006/0200808 | A1 | * | 9/2006 | Kalidindi et al. ............. 717/136 |

FOREIGN PATENT DOCUMENTS

| CN | 1722100 A | 1/2006 |
| CN | 1779652 A | 5/2006 |

* cited by examiner

*Primary Examiner* — Chat Do
*Assistant Examiner* — Sergio J Curbelo, III
(74) *Attorney, Agent, or Firm* — Novak Druce Connolly Bove + Quigg LLP

(57) ABSTRACT

In a method for debugging device drivers of a computing device, a command line interface (CLI) is created in a user space of an operating system of the computing device. A command input by a user is received through the CLI, and transmitted to a kernel space of the operating system. The command is parsed to determine a function of a device driver and parameters of the function. An address of the function is inquired in the kernel space. The function is debugged according to the address of the function in the kernel space.

9 Claims, 3 Drawing Sheets

COMPUTING DEVICE AND DEVICE DRIVER DEBUGGING METHOD

BACKGROUND

1. Technical Field

Embodiments of the present disclosure relate generally to driver debugging, and particularly to a computing device and a driver debugging method of the computing device.

2. Description of Related Art

Operating systems of computing devices, such as LINUX and WINDOWS, usually segregate their virtual memory into a kernel space and a user space. Most device drivers of a computing device are installed and implemented in the kernel space. The device drivers may need to be amended or upgraded during development of the computing device. When a device driver is amended or upgraded, the device driver needs to be debugged. However, the device driver cannot be debugged by the developer through the user space, and the debugging information of the device driver cannot be output to be shown through the user space. Furthermore, during the debugging process of the device driver, the developer usually needs to check values of registers of the device driver to determine whether the device driver works normally. However, the values cannot be directly acquired through the user space, which causes the debugging of the device driver to become difficult.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
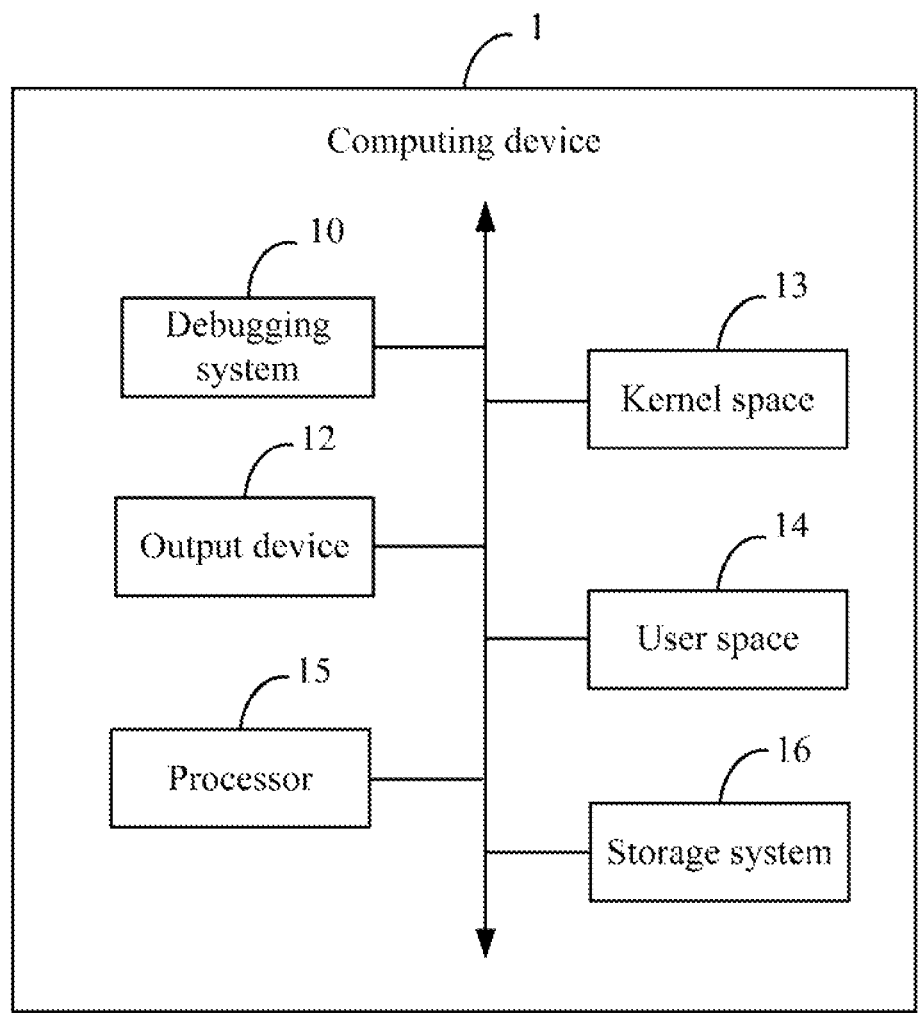
FIG. 1 is a block diagram of one embodiment of a computing device including a debugging system.
Figure 2:
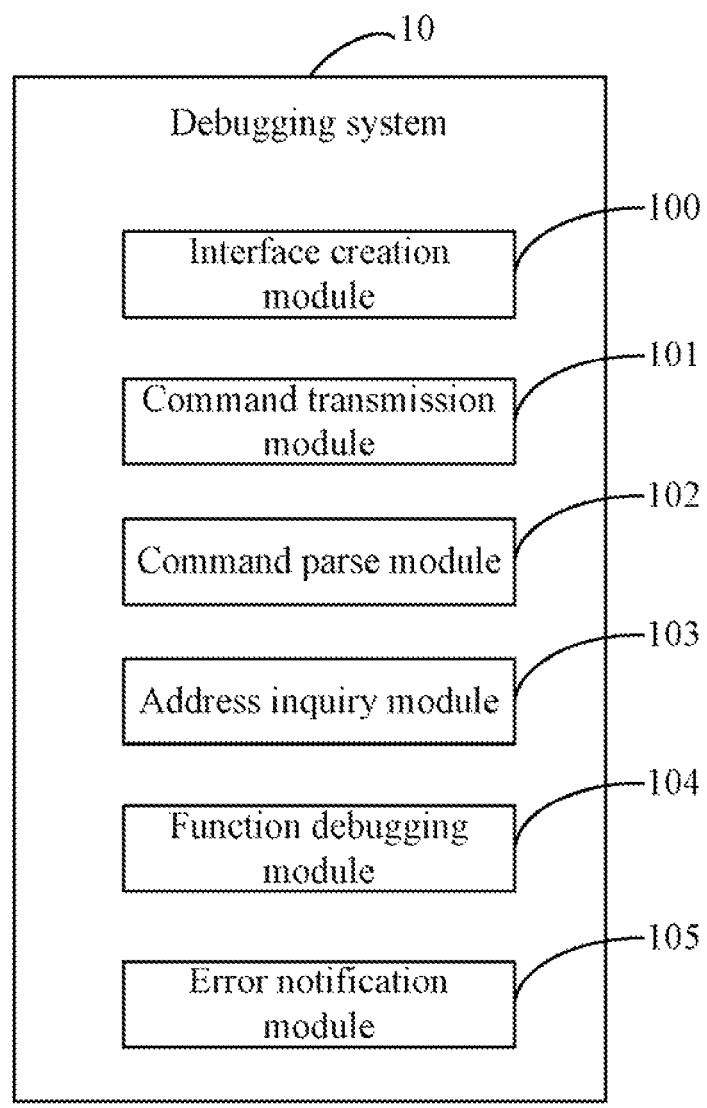
FIG. 2 is a block diagram of one embodiment of functional modules of the debugging system in FIG. 1.

FIG. 1 is a block diagram of one embodiment of a computing device 1 including a debugging system 10. The device 1 further includes an output device 12, a kernel space 13, a user space 14, a processor 15, and a storage system 16. In the embodiment, an operating system of the device 1 segregates virtual memory of the operating system into the kernel space 13 and the user space 14. The kernel space 13 is strictly reserved for running a kernel, kernel extensions, and device drivers of the device 1. The user space 14 is a virtual memory area in which user mode applications of the device 1 work, and this virtual memory area can be swapped out when necessary. The debugging system 10 can debug the device drivers of the computing device 1 through the user space 14, and output debugging information through the output device 12. FIG. 1 is only one example of the device 1 and the device 1 can include more or fewer components than those shown in the embodiment, or a different configuration of the various components.

The debugging system 10 may include a plurality of software programs in the form of one or more computerized instructions stored in the storage system 16, and executed by the processor 15 to perform the operations of the computing device 1. In the embodiment, the debugging system 10 includes an interface creation module 100, a command transmission module 101, a command parse module 102, an address inquiry module 103, a function debugging module 104, and an error notification module 105. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The interface creation module 100 is operable to create a command line interface (CLI) in the user space 14. The CLI is an interface that is provided to a user for interacting with the operating system or software applications of the computing device 1 by typing commands through the CLI to perform specific tasks. In one example, the interface creation module 100 may create the CLI by executing a program code "entry=create_proc_entry ("q1a2dbg", 0644, null)", to create a CLI that is named "/proc/q1a2dbg".

The command transmission module 101 is operable to receive a command input by the user through the CLI, and transmit the received command to the kernel space 13. In one embodiment, the user may input the command using an input device, such as a keyboard of the device 1, through the CLI. For example, a command "#q1a2DbgSwitch 11>/proce/q1a2dbg" may be input by the user.

The command parse module 102 is operable to determine whether the command is successfully transmitted to the kernel space 13, and parse the command to determine a function of a device driver that needs to be debugged and parameters of the function when the command is transmitted to the kernel space 13. In one example, if the command "#q1a2DbgSwitch 11>/proce/q1a2dbg" is transmitted to the kernel space 13, a function that is named "q1a2DbgSwitch" is determined to be the function that needs to be debugged, and "11" are parameters of the function that is composed of a first parameter "1" and a second parameter "1".

The command parse module 102 is further operable to determine a class of debugging information of the function and a switch state of the debugging information according to the parameters from the command. In the embodiment, debugging information of the device driver of the computing device 1 is classified according to functions of the device driver. The first parameter represents a class of debugging information. For example, the first parameter "1" refers to a first class of the debugging information. The second parameter represents that a switch state of the debugging information for determining whether the debugging information of the function is enabled be output to the output device 12 through the user space 14 when it is enabled. For example, the second parameter "1" denotes that a switch "on" state of the debugging information and the debugging information of the function is enabled to be output to the output device 12. The second parameter "0" denotes that a switch "off" state of the debugging information and the debugging information of the function is disenabled to be output to the output device 12. The parameters "11" represents to a first class of debugging information is enable to be output to the output device 12. Similarly, if the first parameter is "2", and the second parameter is "0", it denotes that a second class of the debugging information of the device driver is disenabled to be output to the output device 12.

The address inquiry module 103 is operable to inquire an address of the function in the kernel space 13.

The function debugging module 104 is operable to debug the function according to the address of the function in the kernel space 13, and control debugging information corresponding to the determined class of the debugging information from the device driver to be output or not to be output according to the switch state of the debugging information. In one embodiment, the function debugging module 104 may output the debugging information of the function to the output device 12 through the user space 14 if the debugging information is enabled. In one embodiment, the output device 12 may be a display, and the debugging information may be output and displayed on the display, so the user can determine whether the function of the device driver works normally according to the displayed debugging information.

The error notification module 105 is operable to generate an error message to notify the user of errors, if the command fails to transmit to the kernel space 13 or the address of the function is not inquired in the kernel space 13.

Figure 3:
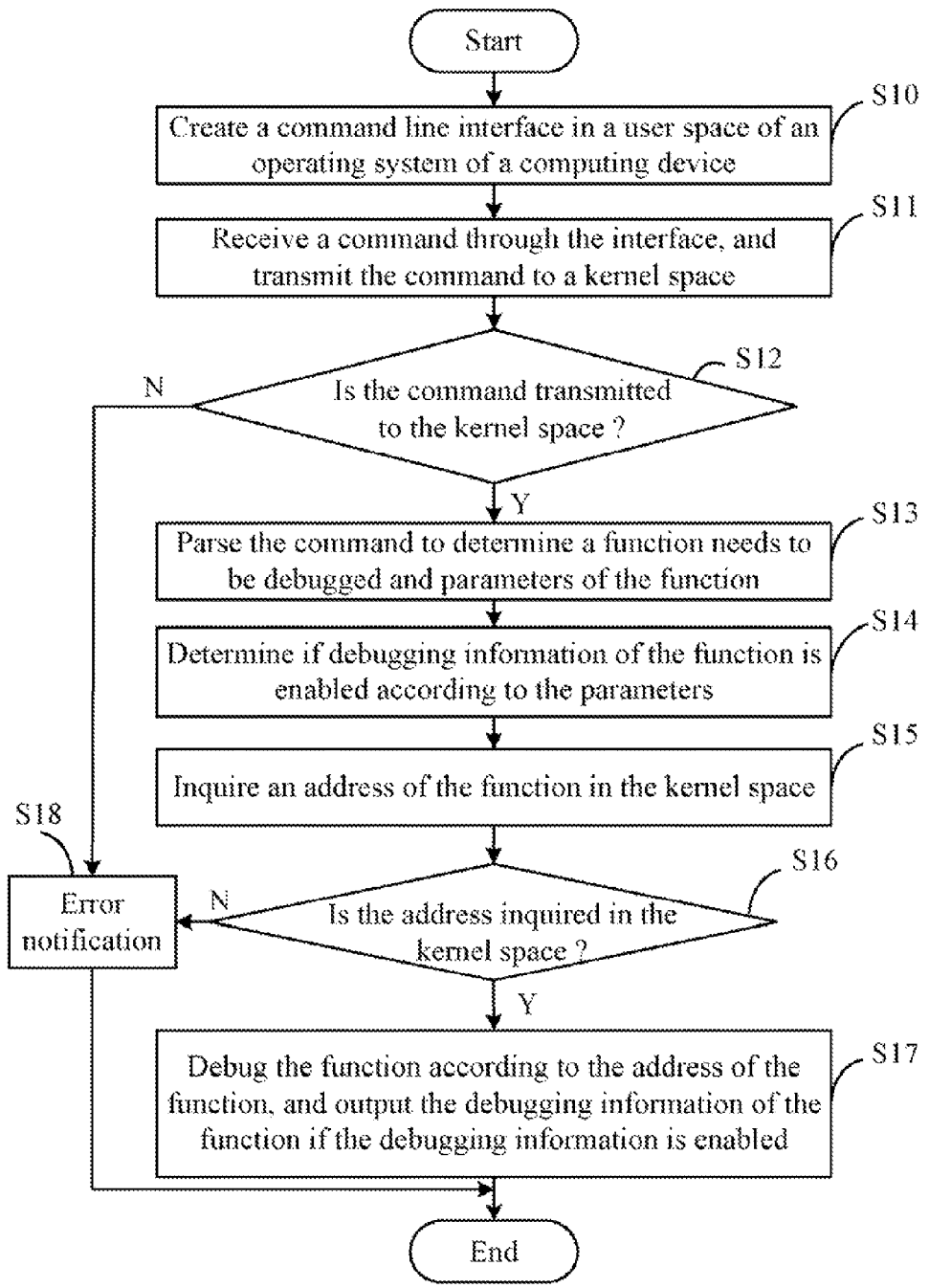
FIG. 3 is a flowchart of one embodiment of a method for debugging a device driver of the computing device using the debugging system of FIG. 1.

FIG. 3 is a flowchart of one embodiment of a method for debugging the device driver of the computing device 1 using the debugging system 10 of FIG. 1. Depending on the embodiment, additional blocks may be added, others removed, and the ordering of the blocks may be changed.

In block S10, the interface creation module 100 creates a command line interface (CLI) in the user space 14. The CLI can be used by the user for interacting with the operating system or software applications of the device 1 by typing commands through the CLI to perform specific tasks.

In block S11, the command transmission module 101 receives a command input by the user through the CLI, and transmits the received command to the kernel space 13. In one embodiment, the user may input the command using the keyboard of the device 1 through the CLI.

In block S12, the command parse module 102 determines whether the command is successfully transmitted to the kernel space 13. If the command is transmitted to the kernel space 13, block S13 is implemented. If the command fails to transmit to the kernel space 13, block S18 is implemented.

In block S13, the command parse module 102 parses the command to determine a function of the device driver that needs to be debugged and parameters of the function. For example, if the command is "#q1a2DbgSwitch 11>/proce/q1a2dbg", a function that is named "q1a2DbgSwitch" is determined to be the function needs to be debugged, and "11" are parameters of the function that is composed of a first parameter "1" and a second parameter "1".

In block S14, the command parse module 102 determines a class of debugging information of the function and a switch state of the debugging information according to the parameters from the command.

In block S15, the address inquiry module 103 inquires an address of the function in the kernel space 13.

In block S16, the address inquiry module 103 determines whether the address of the function is inquired in the kernel space 13. If the address of the function is not inquired in the kernel space 13, block S18 is implemented. If the address of the function is inquired in the kernel space 13, block S17 is implemented.

In block S17, the function debugging module 104 debugs the function according to the address of the function in the kernel space 13. In addition, the function debugging module 104 further controls debugging information corresponding to the determined class of the debugging information from the device driver to be output or not to be output according to the switch state of the debugging information until the procedure ends.

In block S18, the error notification module 105 generates an error message to notify the user of errors.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A computerized method for debugging device drivers of a computing device, the method comprising:
    creating a command line interface (CLI) in a user space of an operating system of the computing device;
    receiving a command input by a user through the CLI using an input device of the computing device, and transmitting the received command to a kernel space of the operating system;
    parsing the command to determine a function of a device driver of the computing device and parameters of the function when the command is transmitted to the kernel space, the device driver storing different class of debugging information;
    determining a class of debugging information of the function and a switch state of the debugging information according to the parameters from the parsed command, the parameters comprising a first parameter representing a class of debugging information and a second parameter representing a switch state of the debugging information to determine whether debugging information of the function is enabled to be output; inquiring an address of the function in the kernel space; and
    debugging the function of the device driver according to the address of the function in the kernel space; and
    controlling debugging information corresponding to the determined class of the debugging information from the device driver to be output when the switch state of the debugging information is the switch on state, or controlling debugging information corresponding to the determined class of the debugging information from the device driver not to be output when the switch state of the debugging information is the switch off state.

2. The method according to claim 1, further comprising:
    generating an error message to notify the user of errors, if the command fails to transmit to the kernel space or the address of the function is not inquired in the kernel space.

3. The method according to claim 1, wherein when the second parameter is equal to "1" representing the switch on state of the debugging information, and when the second parameter is equal to "0" representing that the switch off state of the debugging information.

4. A computing device, comprising:
    an output device;
    at least one processor;
    a storage system; and
    one or more programs stored in the storage system and being executable by the at least one processor, the one or more programs comprising:
    an interface creation module that creates a command line interface (CLI) in a user space of an operating system of the computing device;

a command transmission module that receives a command input by a user through the CLI, and transmits the received command to a kernel space of the operating system;

a command parse module that parses the command to determine a function of a device driver of the computing device and parameters of the function when the command is transmitted to the kernel space, the device driver storing different class of debugging information;

the command parse module further determines a class of debugging information of the function and a switch state of the debugging information according to the parameters from the parsed command, the parameters comprising a first parameter representing a class of debugging information and a second parameter representing a switch state of the debugging information to determine whether debugging information of the function is enabled to be output;

an address inquiry module that inquires an address of the function in the kernel space; and a function debugging module that debugs the function of the device driver according to the address of the function in the kernel space; and the function debugging module further controls debugging information corresponding to the determined class of the debugging information from the device driver to be output when the switch state of the debugging information is the switch on state, or controls debugging information corresponding to the determined class of the debugging information from the device driver not to be output when the switch state of the debugging information is the switch off state.

5. The computing device according to claim 4, wherein the one or more programs further comprising:

an error notification module operable to generate an error message to notify the user of errors, if the command fails to transmit to the kernel space or the address of the function is not inquired in the kernel space.

6. The computing device according to claim 4, wherein when the second parameter is equal to "1" representing the switch on state of the debugging information, and when the second parameter is equal to"0" representing that the switch off state of the debugging information.

7. A non-transitory storage medium storing a set of instructions, the set of instructions capable of being executed by a processor of a computing device, cause the computing device to perform a method for debugging device drivers, the method comprising:

creating a command line interface (CLI) in a user space of an operating system of the computing device;

receiving a command input by a user through the CLI using an input device of the computing device, and transmitting the received command to a kernel space of the operating system;

parsing the command to determine a function of a device driver of the computing device and parameters of the function when the command is transmitted to the kernel space, the device driver storing different class of debugging information;

determining a class of debugging information of the function and a switch state of the debugging information according to the parameters from the parsed command, the parameters comprising a first parameter representing a class of debugging information and a second parameter representing a switch state of the debugging information to determine whether debugging information of the function is enabled to be output;

inquiring an address of the function in the kernel space; and debugging the function of the device driver according to the address of the function in the kernel space;

controlling debugging information corresponding to the determined class of the debugging information from the device driver to be output when the switch state of the debugging information is the switch on state, or controlling debugging information corresponding to the determined class of the debugging information from the device driver not to be output when the switch state of the debugging information is the switch off state.

8. The non-transitory storage medium according to claim 7, wherein the method further comprises:

generating an error message to notify the user of errors, if the command fails to transmit to the kernel space or the address of the function is not inquired in the kernel space.

9. The non-transitory storage medium according to claim 7, wherein when the second parameter is equal to "1" representing the switch on state of the debugging information, and when the second parameter is equal to"0" representing that the switch off state of the debugging information.

\* \* \* \* \*